United States Patent
Rankin (10) Patent No.: US 6,487,232 B1
(45) Date of Patent: Nov. 26, 2002

(54) SYSTEM AND METHOD FOR SUPPRESSING MULTIMODING BEHAVIOR OF LASERS

(75) Inventor: Glenn H. Rankin, Menlo Park, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/199,987

(22) Filed: Nov. 24, 1998

(51) Int. Cl.[7] ................................................. H01S 3/08
(52) U.S. Cl. ............................. 372/98; 372/92; 372/93; 372/94; 372/99; 372/45; 372/50; 385/45
(58) Field of Search ............................... 372/98, 94, 99, 372/92, 102, 93, 130, 152, 106, 12, 50, 18, 19, 20, 21, 45, 22, 27; 385/25, 45, 18, 22, 23, 24, 26

(56) References Cited

U.S. PATENT DOCUMENTS

| | | | |
|---|---|---|---|
| 3,395,366 A | | 7/1968 | Snitzer et al. |
| 4,615,032 A | * | 9/1986 | Holbrook et al. ............. 372/45 |
| 4,719,632 A | * | 1/1988 | Lindsey et al. ............... 372/50 |
| 5,132,978 A | * | 7/1992 | Marshall ....................... 372/27 |
| 5,305,402 A | * | 4/1994 | Hill et al. ...................... 372/94 |
| 5,333,219 A | * | 7/1994 | Kuznetsov .................... 372/50 |
| 5,499,261 A | * | 3/1996 | Welch et al. .................. 372/50 |
| 5,513,196 A | * | 4/1996 | Bischel et al. ................ 372/99 |
| 5,561,676 A | * | 10/1996 | Goldberg ...................... 372/18 |
| 5,764,681 A | * | 6/1998 | Ballantyne et al. ........... 372/94 |
| 5,818,630 A | * | 10/1998 | Fermann et al. .............. 372/19 |
| 5,949,801 A | * | 9/1999 | Tayebati ....................... 372/20 |
| 6,134,257 A | * | 10/2000 | Capasso et al. ............... 372/94 |
| 6,151,429 A | * | 11/2000 | Kristensen et al. ......... 385/126 |

FOREIGN PATENT DOCUMENTS

EP    1005118 A2 *  5/2000

OTHER PUBLICATIONS

Koechner W. "Solid–State Laser ENgineering", 4th Edition 1995, Springer–Verlag, Germany, ISBN: 3–540–90167–1, pp. 228–252.

* cited by examiner

Primary Examiner—F. L. Evans
Assistant Examiner—Sang H. Nguyen (57) ABSTRACT

The present invention reduces multimoding of light generated by lasers. An asymmetric dispersion enhancer is included in a laser cavity to increase the asymmetric dispersion of the light amplified in the cavity. As a result, the side modes of the light passing through the cavity are asymmetrically disposed about the fundamental mode and, therefore, are amplified less in the cavity. Consequently, multimoding of the light is better suppressed.

12 Claims, 8 Drawing Sheets

SYSTEM AND METHOD FOR SUPPRESSING MULTIMODING BEHAVIOR OF LASERS

BACKGROUND OF THE INVENTION

1. Field of the Invention

The invention generally relates to lasers and, in particular, to a system and method for suppressing multimoding behavior of lasers by reducing amplification of the side modes of light in the laser cavity. The reduction in amplification of the side modes is achieved by introducing asymmetric dispersion into the laser cavity to dispose the side modes asymmetrically about the fundamental mode.

2. Related Art

There are many different types of lasers which are well known in the art. A laser generally includes a light generation/amplification mechanism residing in a resonant cavity. The light generation/amplification mechanism includes a gain medium that produces and amplifies light. In general, the longer the light travels through the gain medium, the more the light is amplified.

To increase amplification of the light generated by the gain medium, two mirrors are typically located at opposite ends of the cavity, and the light generated by the light generation/amplification mechanism is reflected back and forth between the two mirrors numerous times. The gain medium amplifies the light each time the light is passed through it. Consequently, as the light is reflected back and forth between the two mirrors, the light is increasingly amplified.

Usually, at least one of the mirrors allows some of the light to pass through the mirror. Therefore, some of the light is reflected by the mirror and some of the light passes through the mirror. The light that passes through the mirror is used to form a laser beam that is output by the laser. This laser beam can be used to perform a variety of functions, such as optical signaling, for example, which is well known in the art.

It is the nature of most laser cavities that light at a plurality of discrete ranges of wavelengths (referred to as "modes") are appreciably amplified in the cavity. However, in many situations, it is desirable that the light forming the laser beam have a single predetermined mode or range of wavelengths. For example, a single wavelength range, referred to as the "fundamental mode," usually receives the highest amplification. The other modes, called the "side modes," are preferably suppressed so that only light having the highest amplification propagates from the laser. Failure to suppress the side modes is often referred to as "multimoding."

To suppress the side modes, many lasers position an optical filter in the cavity. The light being reflected between the two mirrors passes through the filter, and the filter attenuates any light outside of the fundamental mode and passes light in the fundamental mode. Alternatively, one of the mirrors can be configured to reflect only light in the fundamental mode to filter the side modes. By filtering out the side modes, the laser can be configured to output only the fundamental mode of the light.

However, most conventional filtering means fail to effectively filter all of the light associated with the side modes. As a result, conventional lasers typically fail to adequately suppress multimoding.

Thus, a previously unaddressed need exists in the industry for providing an improved system and method of suppressing the side modes in a laser.

SUMMARY OF THE INVENTION

The invention overcomes the inadequacies and deficiencies of the prior art discussed above. In general, the invention provides a system and method for suppressing multimoding by reducing amplification of the side modes in a laser cavity.

The invention uses a light generation/amplification mechanism and an asymmetric dispersion enhancer in a cavity of a laser. The light generation/amplification mechanism includes a gain medium that generates and amplifies light. The asymmetric dispersion enhancer receives the light generated by the gain medium and increases the asymmetric dispersion of the light. As a result, the side modes of the light passing through the cavity are asymmetrically disposed about the fundamental mode, thereby reducing the amplification of the side modes.

The invention also provides a method for suppressing multimoding. Briefly described, the method can be broadly conceptualized as including the following steps: providing a laser cavity; amplifying light in the laser cavity; filtering the light; and causing side modes of the light to asymmetrically distribute about a fundamental mode of the light.

The invention has many advantages, a few of which are delineated below, as mere examples.

An advantage of the invention is that light amplified by a laser and having a wavelength outside of a preselected range can be suppressed.

Another advantage of the invention is that amplification of side modes associated with light passing through a laser cavity can be reduced.

Other features and advantages of the invention will become apparent to one skilled in the art upon examination of the following detailed description, when read in conjunction with the accompanying drawings. It is intended that all such features and advantages be included herein in the invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the invention reduces multimoding in lasers by introducing asymmetric dispersion into a laser cavity. The asymmetric dispersion changes the wavelengths of the side modes to distribute the side modes asymmetrically about the fundamental mode. Asymmetrically distributing the side modes about the fundamental mode reduces amplification of the side modes and, therefore, reduces the tendency for multimoding.

Figure 1:
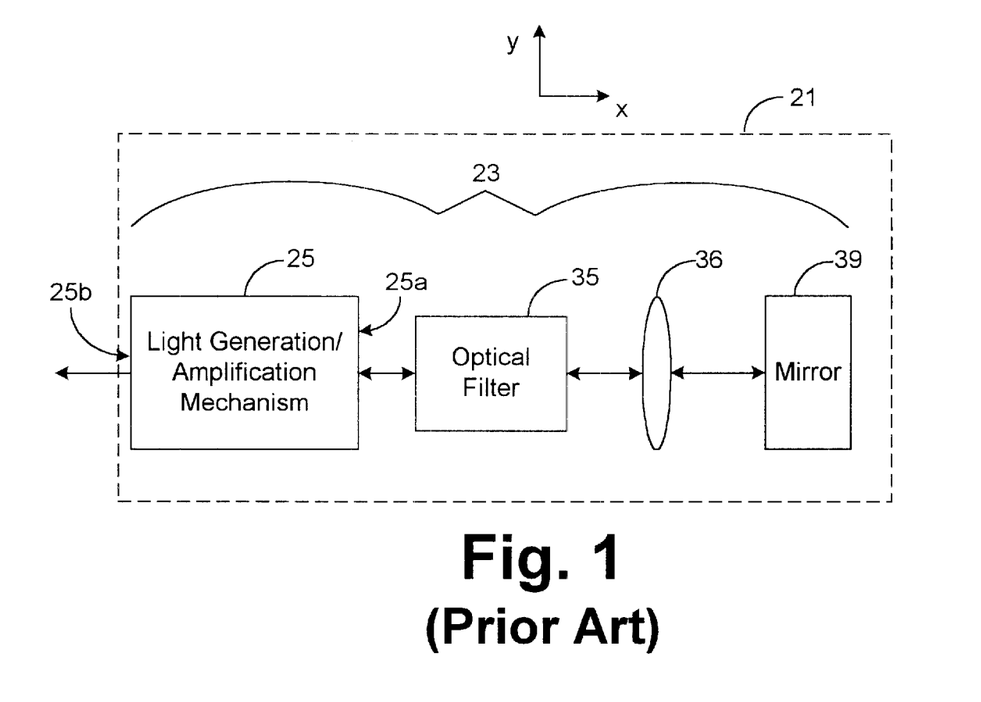
FIG. 1 is a block diagram illustrating a resonant cavity within a conventional laser.
Figure 2A:
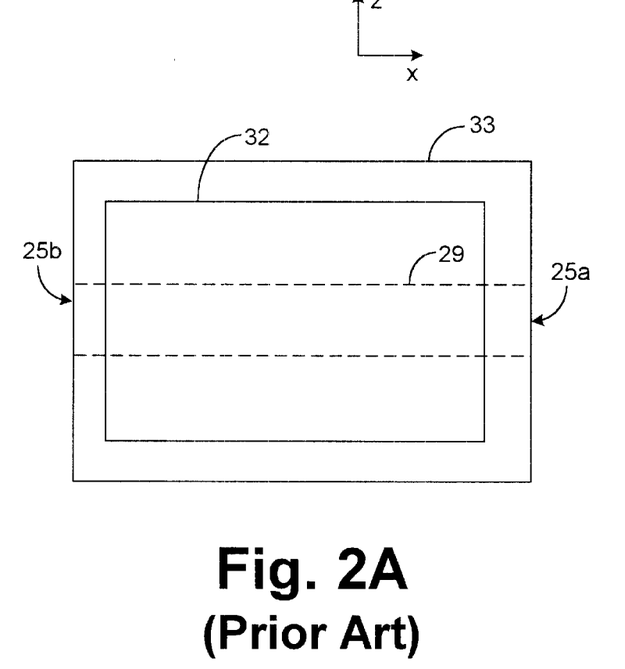
FIG. 2A is a top view of a light generation/amplification mechanism residing within the resonant cavity of FIG. 1.
Figure 2B:
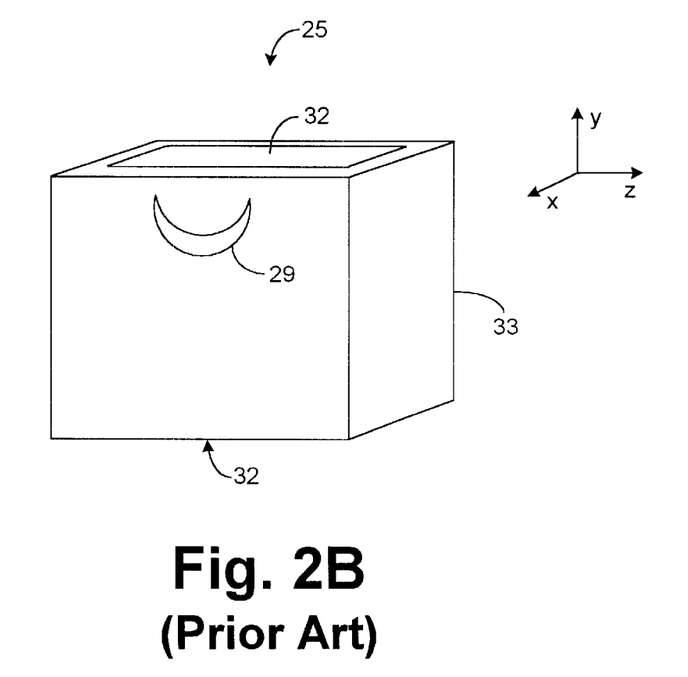
FIG. 2B is a front view of the light generation/amplification mechanism of FIG. 2A.

The invention can be better understood by referring to FIG. 1, which depicts a conventional laser 21. The laser 21 includes a cavity 23. A light generation/amplification mechanism 25 residing in the cavity 23 generates and amplifies light. Many different types of light generation/ amplification mechanisms 25 exist and are commercially available. For example, semiconductor chips are currently available that can be used to generate and amplify the light. FIGS. 2A–2B show a more detailed view of a typical semiconductor chip that can be used as the light generation/ amplification mechanism 25.

Referring to FIG. 2A, the light generation/amplification mechanism 25 includes a core 29 and surrounding material 33 that surrounds the core 29. The core is crescent shaped in FIG. 2B, but many different types of shapes for core 29 are possible. As known in the art, the properties, such as the index of refraction, of the surrounding material 33 are different than the properties of the core 29. As a result, the core 29 acts as a waveguide for the light passing through the light generation/amplification mechanism 25.

The core 29 is comprised of a material, commonly referred to as a "gain medium," that generates light and amplifies the light passing through it. Furthermore, conductive electrodes 32 are applied to opposite surfaces of the light generation/amplification mechanism 25, as depicted by FIG. 2B. A voltage applied between the conductive electrodes 32 causes the core 29 to emit or generate light. For illustrative purposes, assume that the light generated by the core 29 initially travels in the x-direction toward end 25a (FIG. 2A). As this generated light passes through the core 29, it is amplified by the core 29.

The light exits the light generation/amplification mechanism 25 at end 25a and passes through optical filter 35 (FIG. 1), which filters the light according to known techniques. In this regard, the optical filter 35 has a bandpass characteristic that attenuates all but a narrow range of optical wavelengths. After passing through optical filter 35, the light is received by lens 36. The lens 36 assures that the light reflected by the mirror 39 is efficiently focused back into the light generation/amplification mechanism 25. It should be noted that the lens 36 can improve the performance of laser 21 but is not a necessary feature of the laser 21. In fact, some conventional lasers 21 do not include the lens 36.

The mirror 39 reflects the light back through the lens 36 and optical filter 35 to the light generation/amplification mechanism 25. The end 25a of the light generation/ amplification mechanism 25 is usually coated with an anti-reflective coating. The anti-reflective coating increases the amount of light that passes into the light generation/ amplification mechanism 25 by decreasing the amount of light reflected by end 25a. After passing into the core 29, the light is amplified by the core 29 as it passes through the core 29 toward end 25b.

Due to the difference in the index of refraction of end 25b and its surroundings, some of the light is reflected at end 25b, and the remainder of the light exits the light generation/ amplification mechanism 25 at end 25b. The light that is reflected at end 25b travels back through the light generation/amplification mechanism 25 toward end 25a, and the process described above for amplifying the light and reflecting the light back to the light generation/amplification mechanism 25 via the mirror 39 is then repeated. By reflecting the light back and forth through the cavity 23 (i.e., between mirror 39 and end 25b) in this way, the light is increasingly amplified up to what is sometimes referred to a "saturation level." The "saturation level" is the highest level of amplification that can be reached for the gain medium in core 29.

As noted above, not all of the light is reflected at end 25b. The light that is not reflected at end 25b passes out of the light generation/amplification mechanism 25. In many conventional lasers 21, about thirty (30) percent of the light received at end 25b is reflected back through the light generation/amplification mechanism 25, while about seventy (70) percent of the light passes out of the light generation/amplification mechanism 25. The light that passes out of the light generation/amplification mechanism 25 at end 25b forms a laser beam.

As known in the art, the length of the cavity 23 is an important characteristic of the laser 21. The length of the cavity 23 is the distance between mirror 39 and end 25b. The importance of the cavity's length is due, in part, to the fact that changing the length of the cavity 23 affects the wavelengths at which the laser 21 is resonant. In this regard, resonance occurs if the following equation is satisfied:

$$\theta = 2\pi N \qquad \text{Equation (1),}$$

where N is any integer greater than zero and $\theta$ is the optical phase delay experienced by the light when it travels exactly one round trip (e.g., from end 25b to mirror 39 and back to end 25b) in the cavity 23.

The phase delay ($\theta$) of the light traversing the cavity 23 exactly once (i.e., traversing from end 25b to mirror 39 and back to end 25b) can be measured as a function of the angular frequency ($\omega$) of the light. The time delay ($\tau$) can then be calculated by the following equation:

$$\tau = \frac{d\theta}{d\omega}. \qquad \text{Equation (2)}$$

After determining $\tau$, the effective length (L) of the cavity 23 (i.e., the optical path length between end 25b and the mirror 39) can be calculated by the following equation:

$$L = \tau c/2 \qquad \text{Equation (3),}$$

where c is the speed of light.

Through the foregoing equations, the effective length (L) of the cavity 23 can be determined. The calculation of the effective length of the cavity 23 according to Equations (2)–(3) is a well known process and is not described in further detail herein.

Figure 3:
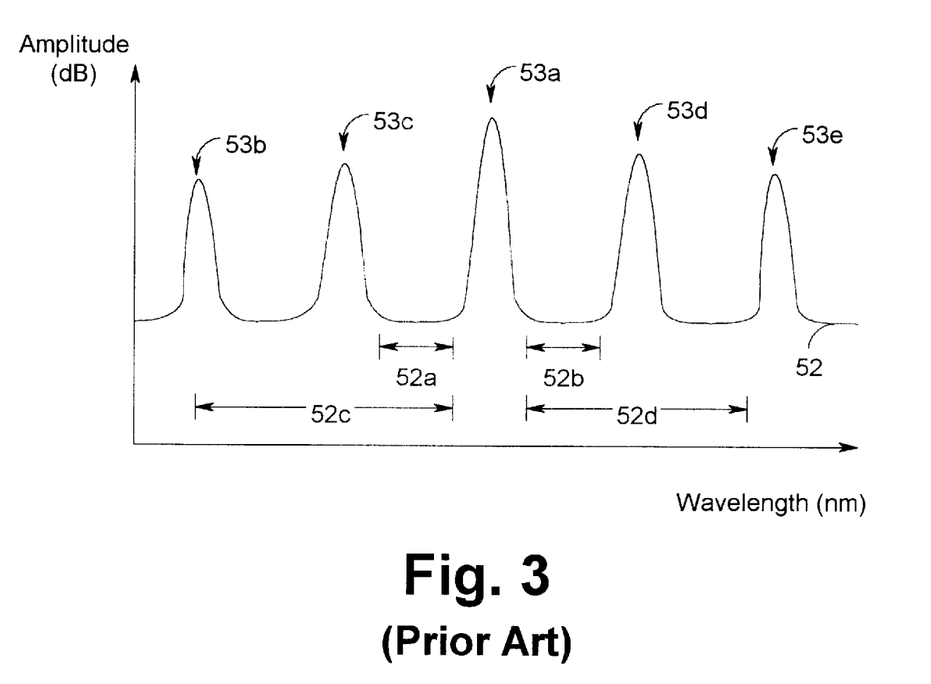
FIG. 3 is a graph illustrating amplitude versus wavelength of the light passing through the resonant cavity of FIG. 1.

The light passing through the cavity 23 is usually amplified more at wavelengths at which the cavity 21 is resonant. For example, FIG. 3 shows an exemplary graph of amplitude versus wavelength of the light passing through the cavity 23. The graph of FIG. 3 is shown for illustrative purposes only, and it should be apparent to one skilled in the art that trace 52 may have other shapes and/or values than those depicted by FIG. 3. As can be seen via trace 52 of FIG. 3, light at wavelengths corresponding to modes 53a–53e is amplified more than light at other wavelengths.

There is usually a single mode 53a (commonly referred to as the "fundamental mode") where amplification of the light is the greatest. In addition, there are usually multiple lower side modes 53b and 53c corresponding to wavelengths below that of the fundamental mode 53a, and there are usually multiple upper side modes 53d and 53e corresponding to wavelengths above that of the fundamental mode 53a. The upper and lower side modes 53b–53e generally have slightly less amplification than the fundamental mode 53a.

Although there is only one fundamental mode 53a, the number of side modes 53b–53e can vary. As known in the art, each lower side mode 53b and 53c can be coupled with one of the upper side modes 53d and 53e via four wave mixing. In the example shown in FIG. 3, the lower side mode 53b is coupled with upper side mode 53e, and the lower side mode 53c is coupled with upper side mode 53d. When asymmetric dispersion in the cavity 23 is low, each pair of coupled side modes is distributed symmetrically about the fundamental mode 53a. In other words, the wavelength difference 52a between fundamental mode 53a and side mode 53c is approximately the same as the wavelength difference 52b between fundamental mode 53a and side mode 53d. Similarly the wavelength differences 52c and 52d are also approximately the same. However, there is not necessarily a relationship between non-coupled side modes. For example, the wavelength difference between modes 53b and 53c is not necessarily the same as the wavelength difference 52a.

In many situations, it is desirable for the laser 21 (FIG. 1) to propagate only one of the modes 53a–53e of the light. Usually the single mode selected for propagation is the fundamental mode 53a, since the fundamental mode 53a has the highest amplification. To suppress the other modes 53b–53e, an optical filter 35 (FIG. 1) is usually designed to attenuate optical signals having wavelengths different from the fundamental mode 53a. Therefore, the optical filter 35 suppresses the multimoding behavior of the laser 21 to some degree (i.e., the side modes 53b–35e are attenuated to some degree).

Devices other than optical filter 35 may be used to suppress multimoding behavior in the laser 21. For example, the mirror 39 can be replaced with a reflective ruled diffraction grating, which reflects light having wavelengths within the fundamental mode 53a back into the cavity 23 but directs light having wavelengths outside of the fundamental mode 53a away from the cavity 23. As a result, light having a wavelength outside of the fundamental mode 53a is effectively removed from the cavity 23, and the side modes 53b–53e are thereby suppressed to some degree. There may be other devices and/or methods known in the art for suppressing the side modes 53b–53e.

Although prior art techniques for suppressing multimoding attenuate the side modes 53b–53e to some degree, most prior art devices and/or methods, such as those described above, fail to completely suppress the side modes 53b–53e. Performance limitations prevent these devices from providing enough selectivity to give a high enough gain differential between the fundamental modes and the side modes. These limitations make it particularly difficult to filter the side modes closest to the fundamental mode 53a in wavelength (i.e., side modes 53c and 53d). Therefore, a system or method is needed to improve conventional lasers 21 by further suppressing the side modes 53b–53e and, in particular, side modes 53c and 53d.

Figure 4:
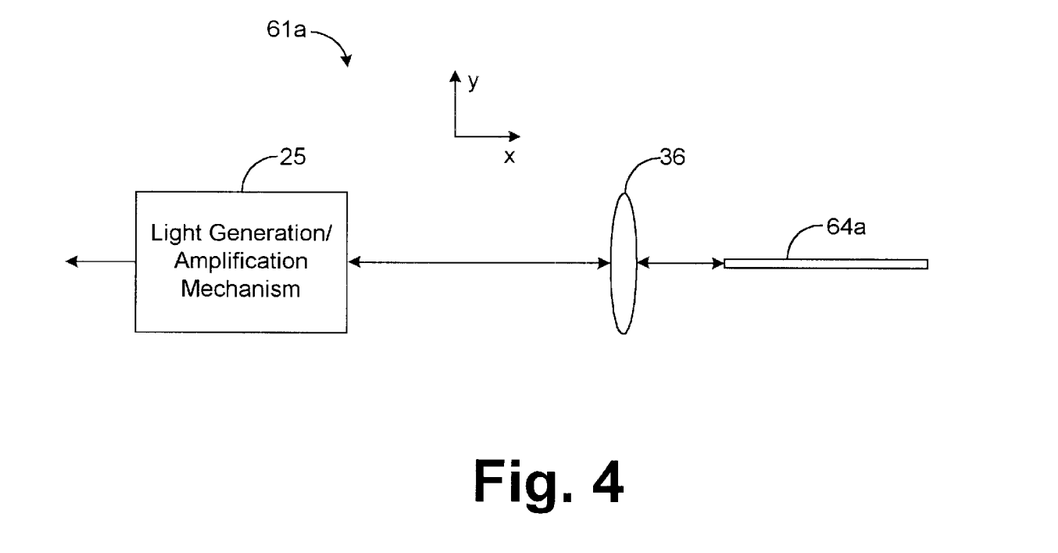
FIG. 4 is a block diagram illustrating a resonant cavity of the preferred embodiment of the present invention.

FIG. 4 depicts a laser cavity 61a of the present invention. The configuration of cavity 61a is similar to the configuration of cavity 23 (FIG. 1) discussed above except that mirror 39 and optical filter 35 in cavity 23 are replaced with asymmetric dispersion enhancer 64a. In the preferred embodiment, asymmetric dispersion enhancer 64a is a reflective filter that increases the asymmetric dispersion of light in the cavity 61a. The asymmetric dispersion enhancer 64a only reflects light having wavelengths within a certain wavelength band back into the cavity 61a. Since it is desirable to propagate the fundamental mode 53a, the reflected band preferably includes the wavelengths corresponding with the fundamental mode 53a. Furthermore, although the reflected band can be centered about other wavelengths, the reflected band is preferably centered about the center of the fundamental mode 53a to maximize the gain of the fundamental mode 53a.

Figure 5:
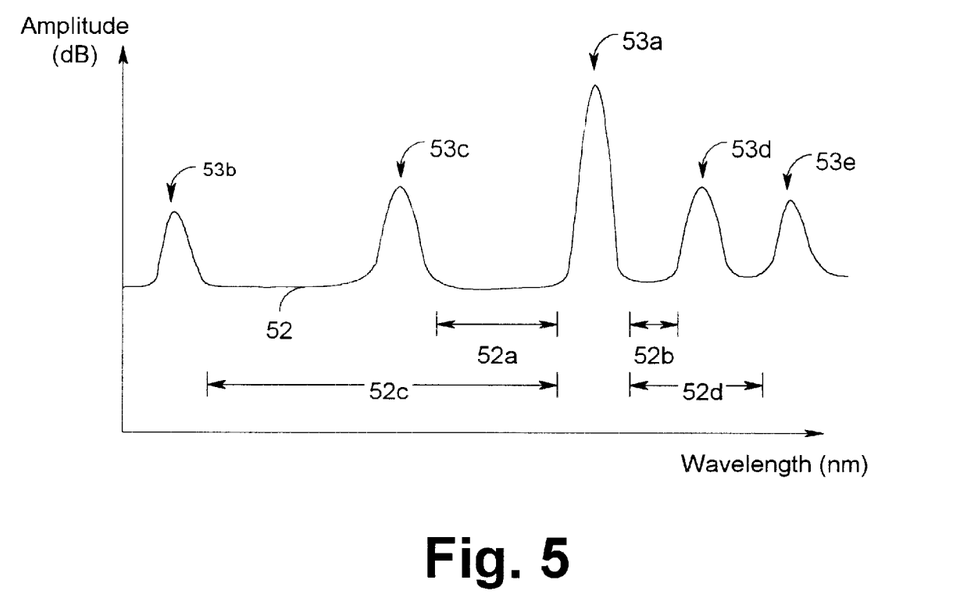
FIG. 5 is a graph illustrating amplitude versus wavelength of the light passing through the resonant cavity of FIG. 4.

In addition to reflecting light in a narrow band of wavelengths, the asymmetric dispersion enhancer 64a also increases the asymmetric dispersion of the light passing through the cavity 61a. "Asymmetric dispersion" is the dispersing of light in such a way that causes a pair of coupled side modes (e.g., 53c and 53d) to become more asymmetrical about the fundamental mode 53a. For example, FIG. 5 shows a graph of amplitude versus wavelength of the light passing through the cavity 61a when the asymmetric dispersion of the light passing through the cavity has been appreciably increased. As can be seen in FIG. 5, unequal wavelength differences 52a and 52b separate the pair of coupled side modes 53c and 53d from the fundamental mode 53a. As the asymmetric dispersion of the light passing through the asymmetric dispersion enhancer 64a increases, the asymmetry of the side modes 53c and 53d about the fundamental mode 53a increases, i.e., the wavelength differences 52a and 52b become more unequal. The increased asymmetric dispersion introduced by the asymmetric dispersion enhancer 64a causes the pair of coupled side modes 53c and 53d to be distributed more asymmetrically about the fundamental mode 53a. Similarly, the increased asymmetric dispersion introduced by the asymmetric dispersion enhancer 64a increases the difference between wavelength differences 52c and 52d and causes the pair of coupled side modes 53b and 53e to be distributed more asymmetrically about the fundamental mode 53a.

Due to the nature of resonance and non-linear coupling, the side modes 53b–53e are amplified less as their distribution becomes more asymmetrical about the fundamental mode 53a. Since the asymmetric dispersion induced by the asymmetric dispersion enhancer 64a reduces the symmetry of the pairs of coupled side modes 53b and 53e, 53c and 53d about-the fundamental mode 53a, the side modes 53b–53e are amplified less by the core 29. As a result, multimoding of the light output by the laser cavity 61a is better suppressed.

To increase the asymmetric dispersion of the light passing through the cavity 61a, the difference of the effective length of the cavity 61a for each side mode (e.g., 53c and 53d) constituting a pair of coupled side modes should be increased. As the difference in the effective length of the cavity 61a for the light in side mode 53c and the effective length of the cavity 61a for the light in side mode 53d increases, the side modes 53c and 53d are distributed more asymmetrically about the fundamental mode 53a. Consequently, the side modes 53c and 53d are amplified less in the cavity 61a.

Figure 6:
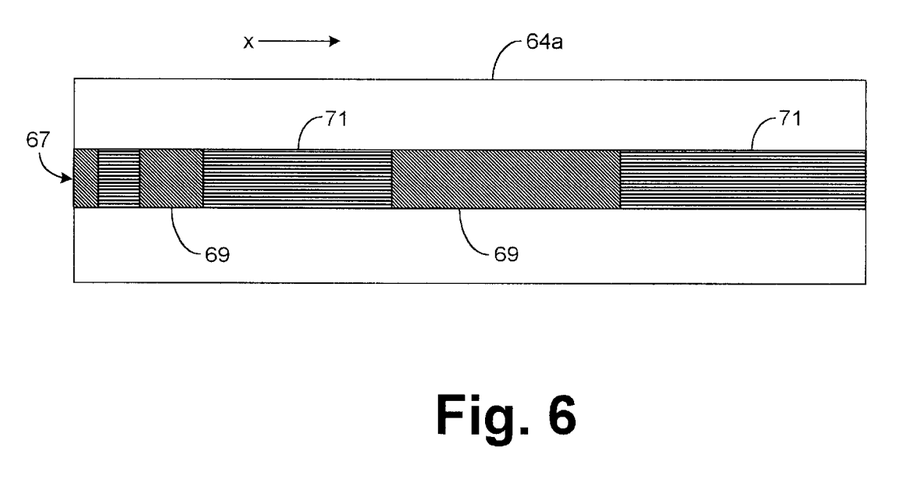
FIG. 6 is a longitudinal cross sectional view of an asymmetric dispersion enhancer depicted in FIG. 4.

The difference in the effective length of the cavity 61a for each side mode constituting a pair coupled of side modes (e.g., side modes 53c and 53d) can be increased by changing the index of refraction of the core of the asymmetric dispersion enhancer 64a along the optical path length of the asymmetric dispersion enhancer 64a. As shown by FIG. 6, the asymmetric dispersion enhancer 64a includes a core 67, which is a waveguide for the light passing through the asymmetric dispersion enhancer 64a. As an example, the asymmetric dispersion enhancer 64a cap be a fiber Bragg grating configured to increase the asymmetric dispersion of the light passing through it. As light enters and passes through the asymmetric dispersion enhancer 64a in the x-direction, changes in the index of refraction of the core 67 cause the light to be reflected at various points back into the opposite direction, i.e., toward light generation/amplification mechanism 25.

Figure 7:
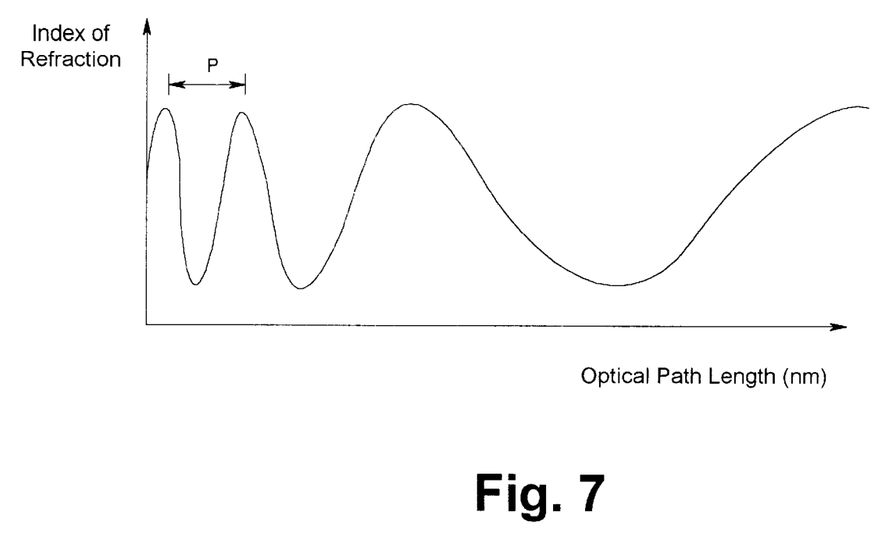
FIG. 7 is a graph illustrating index of refraction versus optical path length of the asymmetric dispersion enhancer of FIG. 6.

As can be seen by referring to FIG. 7, the spatial frequency of the changes or oscillations of the index of refraction for the core 67 varies with respect to the optical path length. In other words, the distance (p) between successive maxima of the index of refraction of the core 67 changes (e.g., increases or decreases) along the optical path length. As known in the art, the optical path length of a waveguide is the physical length of the waveguide multiplied by the effective index of the waveguide. For light with a specific temporal frequency, the effective index of the waveguide is the ratio of the wavelength that the light has in free space to the wavelength that it has as a guided wave. Therefore, the spatial frequency of the oscillations of the index of refraction depicted in FIG. 7 is a function of the physical length and the effective index of the asymmetric dispersion enhancer 64a. In other words, the spatial frequency of the oscillations of the index of refraction versus the optical path length can be varied along the length of the core 67 by either changing the spatial frequency of the oscillations of the index of refraction along the physical length of the core 67 or by changing the effective. index along the physical length of the core 67.

FIG. 6 shows the preferred embodiment of the dispersion enhancer 64a based on a modified Fiber Bragg grating in which the spatial frequency of oscillations of the index of refraction along the physical length of the core 67 varies to provide an asymmetric dispersion of the light. The different shading of the core 67 in FIG. 6 indicates different value ranges of the index of refraction. For example, one type of shading 69 indicates regions where the index of refraction exceeds a median value of the index of refraction while the other type of shading 71 indicates where the index of refraction is less than the median value.

Alternatively or in combination with changing the spatial frequency of oscillations of the index of refraction along the physical length of the core 67, the effective index of the asymmetric dispersion enhancer 64a can be changed (i.e., either increased or decreased) along the physical length of the core 67 to vary the spatial frequency of the index of refraction along the optical path length of the core 67. In this regard, increasing the effective index along the physical length of the core 67 has the effect of decreasing the spatial frequency of the index of refraction along the optical path length of the core 67, and decreasing the effective index along the physical length of the core 67 has the effect of increasing the spatial frequency of the index of refraction along the optical path length of the core 67. The second embodiment, which will be discussed in further detail below, shows a device that changes the effective index along the physical length of the core 67.

Accordingly, the index of refraction of the core 67 is varied (i.e., increased or decreased) relative to the optical path length of the core 67 by changing the spatial frequency of the oscillations of the index of refraction along the physical length of the core 67 and/or by changing the effective index along the physical length of the core 67, as is discussed further below in the second embodiment. Varying the spatial frequency of the oscillations in the index of refraction along the optical path length makes the effective length of the cavity 61a for each of the side modes constituting a pair of coupled side modes different. As a result, the pair of coupled side modes is asymmetrically disposed about the fundamental mode 53a, and the light of the side modes 53b–53e is amplified less in the cavity 61a. Suppression of the multimoding of the light passing through the cavity 61a is therefore improved.

It should be noted that the amount of dispersion that asymmetric dispersion enhancer 64a is required to provide depends on the desired level of suppression of the side modes 53b–53e. In some applications, a small level of multimoding behavior may be acceptable, while in other applications, the multimoding behavior should be suppressed as much as possible. Therefore, an asymmetric dispersion enhancer 64a that provides sufficient dispersion for one application may not provide sufficient dispersion for another. Moreover, the more dispersion introduced by the asymmetric dispersion enhancer 64a, the more the side modes 53b–53e are suppressed. Consequently, the amount of dispersion should be increased until the desired level of suppression of the side modes 53b–53e is reached. However, increasing dispersion may affect the amplitude response for the cavity 61a by reducing the amount of gain of the fundamental mode 53a relative to the side modes 53b–53e. Therefore, there is a trade-off between degradation of the amplitude response and suppression of the side modes 53b–53e.

It should be further noted that the optical filter 35 of FIG. 1 may be inserted into the cavity 61a, if desired. It is not necessary that the asymmetric dispersion enhancer 64a provide all of the optical band-pass filtering needed in the cavity 61a, and another device such as optical filter 35 may provide some or all of this filtering. However, the asymmetric dispersion enhancer 64a should increase the dispersion of the light passing through the cavity 61a in order to suppress attenuation of the side modes 53a–53e.

Second Embodiment

Figure 8:
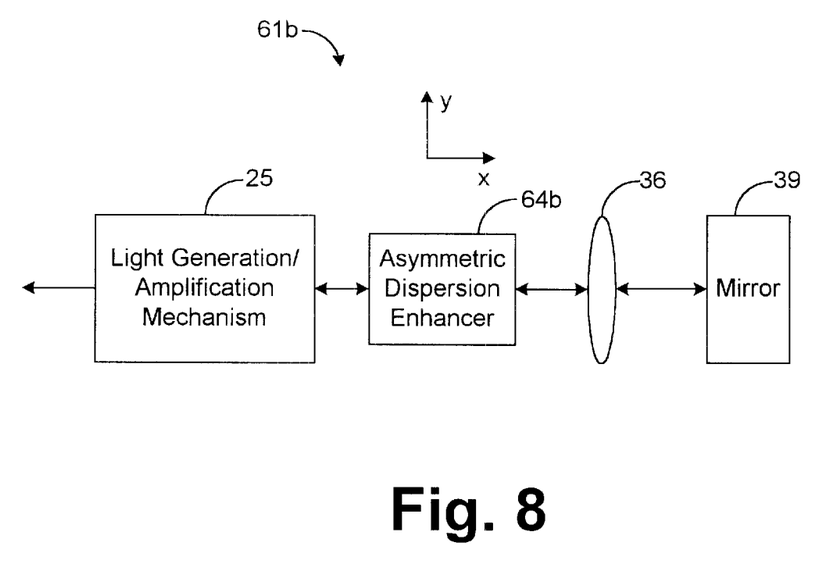
FIG. 8 is a block diagram illustrating a resonant cavity of the second embodiment of the present invention.

FIG. 8 depicts a second embodiment of the invention. In this embodiment, the asymmetric dispersion enhancer 64b is preferably an optical filter 35 (FIG. 1), such as an acoustic-optic tuned filter (AOTF) or other type of waveguide filter, modified to increase the dispersion of the light passing through it. Therefore, the second embodiment of the present invention is structurally the same as the conventional laser 21 shown in FIG. 1 except that the conventional filter 35 is replaced by the asymmetric dispersion enhancer 64b, that increases the asymmetric dispersion of the light passing through the cavity 61b.

Figure 9A:
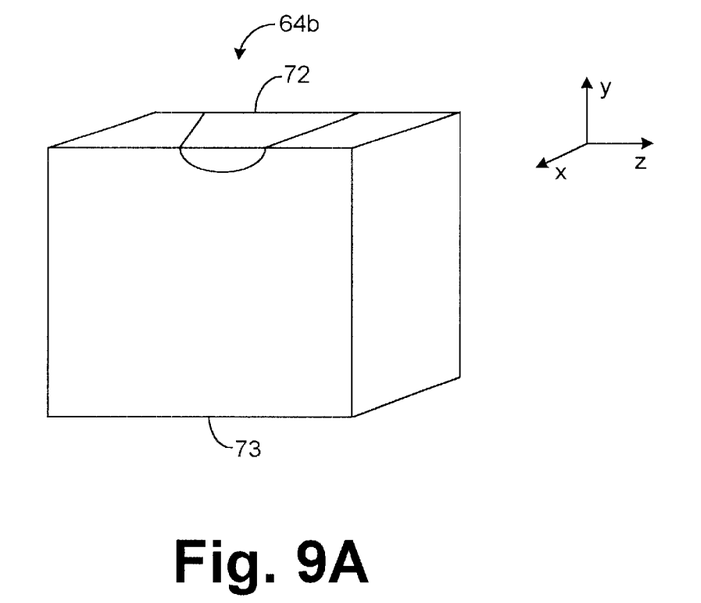
FIG. 9A is a front view of the asymmetric dispersion enhancer depicted in FIG. 8.
Figure 9B:
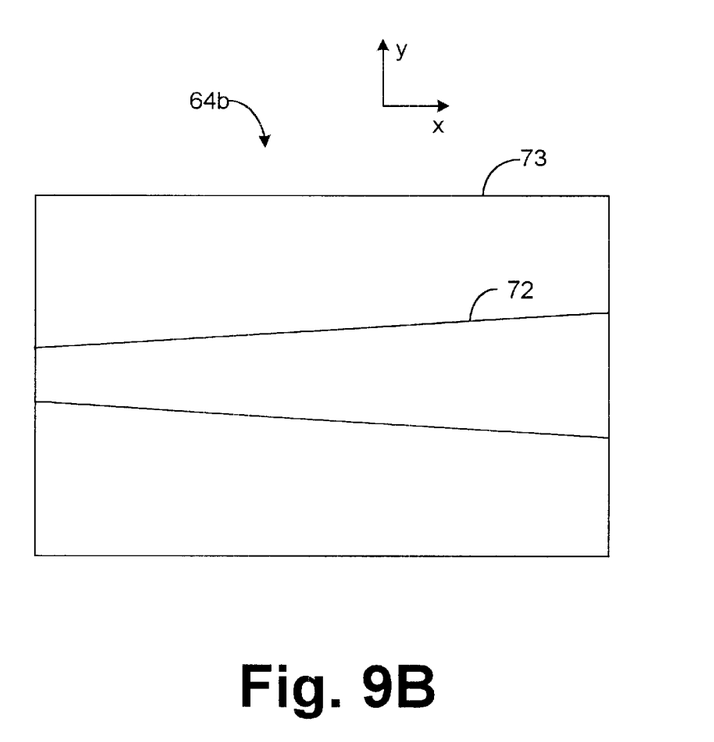
FIG. 9B is a top view of the asymmetric dispersion enhancer depicted by FIG. 9A.

FIGS. 9A and 9B depict the asymmetric dispersion enhancer 64b of the second embodiment. The asymmetric dispersion enhancer 64b is similar to conventional optical waveguide filters except that the core is tapered to increase asymmetric dispersion. Therefore, FIGS. 9A and 9B only depict the core 72 and surrounding material 73 of the asymmetric dispersion enhancer 61b for simplicity. However, the asymmetric dispersion enhancer 61b may include other components (not shown) known in the art for filtering the optical signals and performing other functions.

The core 72 of the asymmetric dispersion enhancer 64b is an optical wave guide. However, to increase the asymmetric dispersion of the light passing through the asymmetric dispersion enhancer 64b, the cross sectional area of the core changes along the length of the asymmetric dispersion enhancer 64b, i.e., in the x-direction. Changing (i.e., either increasing or decreasing) the cross sectional area of the core 72 along the length of the core 72 varies the effective index of the asymmetric dispersion enhancer 64 along the physical length of the core 67. Consequently, the spatial frequency of the oscillations of the index of refraction of the core 67 changes along the optical path length of the core 67. This reduces the symmetry of the pairs of coupled side modes 53b and 53e, 53c and 53c about the fundamental mode 53a, thereby reducing the amplification of the side modes 53b–53e.

It should be noted that other devices may be used to increase the asymmetric dispersion of the light passing through the cavity. Any device capable of increasing the asymmetric dispersion of the light a sufficient amount to suppress the side modes 53b–53e to a desired level is suitable for implementing the present invention. Furthermore, although only linear lasers have been depicted and discussed herein, the asymmetric dispersion enhancers 64a and 64b may be used with other types of lasers known in the art.

In concluding the detailed description, it should be noted that it will be obvious to those skilled in the art that many variations and modifications may be made to the preferred embodiment without substantially departing from the present invention. All such variations and modifications are intended to be included herein within the present invention, as set forth in the following claims.

I claim:

1. A laser having a resonant cavity, said laser comprising:
   a gain medium located within said resonant cavity; and
   an asymmetric dispersion enhancer located within said resonant cavity configured to asymmetrically distribute coupled side modes of an amplifying light about a fundamental mode.

2. The laser of claim 1, wherein said asymmetric dispersion enhancer includes a core having an index of refraction, an optical path length, and an exposed surface capable of receiving light, said index of refraction oscillating with respect to said optical path length at a varying spatial frequency in a direction perpendicular to said exposed surface.

3. The laser of claim 1, wherein said asymmetric dispersion enhancer includes a tapered core.

4. The laser of claim 3, wherein said asymmetric dispersion enhancer filters light that is passing through said tapered core.

5. The laser of claim 1, wherein said asymmetric dispersion enhancer includes an optical fiber.

6. The laser of claim 1, wherein said asymmetric dispersion enhancer includes a waveguide having a first end, a second end, an index of refraction, and an optical path length, said first end opposite of said second end and having an exposed surface capable of receiving light, said index of refraction oscillating with respect to said optical path length at a varying spatial frequency in a direction parallel to a centerline of said waveguide, said centerline extending from said first end to said second end.

7. A laser, comprising:
   means for defining a laser resonant cavity;
   means for amplifying light within said laser resonant cavity; and
   means for increasing an asymmetric dispersion by asymmetrically distributing coupled side modes about a fundamental mode of said light as said light passes through said increasing means.

8. The laser of claim 7, wherein:
   said increasing means includes a core having an index of refraction, an optical path length, and an exposed surface capable of receiving light, said index of refraction oscillating with respect to said optical path length at a varying spatial frequency in a direction perpendicular to said exposed surface.

9. The laser of claim 7, wherein:
   said increasing means includes a core having a tapered cross sectional area.

10. The laser of claim 9, wherein said increasing means filters light that is passing through said tapered cross sectional area of said core.

11. The laser of claim 7, wherein:
    said increasing means includes a having a first end, a second end, an index of refraction, and an optical path length, said first end opposite of said second end and having an exposed surface capable of receiving light, said index of refraction oscillating with respect to said optical path length at a varying spatial frequency in a direction parallel to a centerline of said waveguide, said centerline extending from said first end to said second end.

12. A method for suppressing multimoding within lasers, the method comprising steps of:
    providing a laser cavity;
    providing a waveguide within said laser cavity;
    amplifying light within said laser cavity;
    filtering said light within said laser cavity; and
    increasing an asymmetric dispersion by asymmetrically distributing coupled side modes about a fundamental mode of said light as said light passes through said waveguide.

* * * * *